Figure 1:
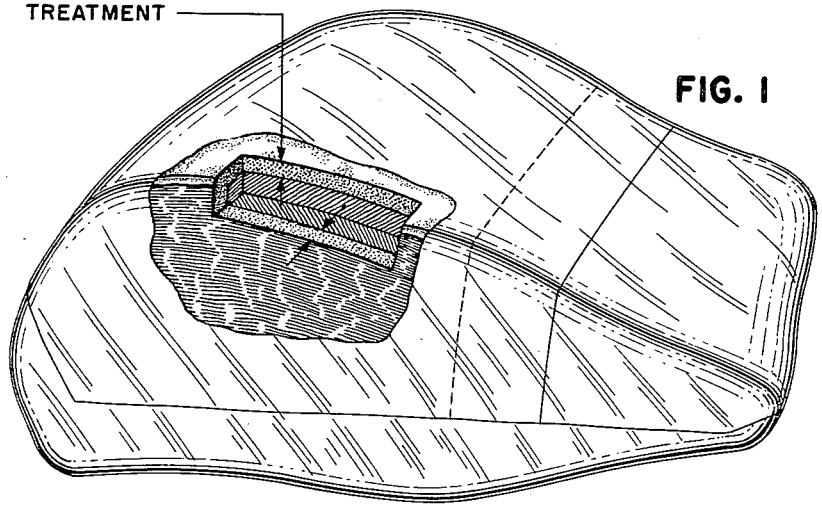

Feb. 25, 1964     P. BEEBE, JR     3,122,748

MEAT PACKAGE AND METHOD OF PREPARING SAME

Filed June 17, 1959

INVENTOR.
PAUL BEEBE, JR.

BY

*J. B. Holden*
ATTORNEY

United States Patent Office 3,122,748
Patented Feb. 25, 1964

3,122,748
MEAT PACKAGE AND METHOD OF
PREPARING SAME
Paul Beebe, Jr., Cuyahoga Falls, Ohio, assignor to The Goodyear Tire & Rubber Company, Akron, Ohio, a corporation of Ohio
Filed June 17, 1959, Ser. No. 820,976
4 Claims. (Cl. 99—174)

This invention relates to a novel method of treating red meat with carbon monoxide and packaging the same, primarily for display in the supermarkets where the customer demands a meat having the appearance of having been recently cut. The meat may be displayed in either the frozen or unfrozen state. The carbon monoxide treatment gives the meat a red color closely approaching the color of the meat soon after cutting, and the color thus given to the meat is maintained through the merchandising cycle by proper packaging.

By a raw red meat, we are concerned primarily with raw beef, but include fresh raw pork and lamb, and exclude smoked meats, poultry and fish.

There are two pigments generally regarded as contributing to the color of red meat, myoglobin and hemoglobin. Hemoglobin is found in the blood, myoglobin in the tissue. Since the animal is bled when it is slaughtered, most of the color pigment left in the carcass is myoglobin. Both of these pigments are purplish in color.

Raw red meat that is freshly cut is characteristically purplish in color, mostly as a result of the myoglobin color. Exposure to an adequate supply of oxygen forms oxymyoglobin which gives the desirable red color of the meat. The same type of reaction and change in color occurs with hemoglobin.

With an inadequate supply of oxygen, myoglobin is converted to metmyoglobin, and this is brownish-grey in color, or the color commonly seen in meat surfaces which are old. The usual transparent wrapping films are relatively impermeable to oxygen, and the red color of the oxymyoglobin gradually changes to brownish-grey and the meat packaged in them becomes unsaleable, usually two to four days after wrapping.

These two to four days represent the present salable period for wrapped red meat. This is too short to permit the meat to be wrapped at a central location and sent out to the supermarkets or other retail outlets. Note that the time is measured from the time of wrapping. The animal may have been slaughtered as much as a week or ten days earlier. It is shipped in quarters, halves, or "wholes" to the place where it is cut into retail cuts, which are first purple, and they are generally "bloomed" (exposed to air) for 15 to 30 minutes to create the red color. Then they are wrapped and displayed, and must be sold, and the expected salable life is now two to four days.

It has been known that when red meat is treated with carbon monoxide a red pigment or the like is formed, but such treatment has never had any commercial value. Heretofore no one has appreciated that meat treated with carbon monoxide to produce a red surface pigmentation would maintain a salable color for a longer period than meat which has not undergone any chemical treatment, and that when packaged in a transparent film of suitable properties it will present an attractive appearance to the purchaser long enough to permit packaging at a central location with shipment to the retail outlets.

The efforts toward the production of merchandizable red meat packages have been directed to the preservation and prolongation of the natural color in the meat. It has not heretofore been appreciated that by a preliminary treatment with carbon monoxide, carbon-monoxide myoglobin is produced which has no deleterious effect upon the meat, and which possesses a desirable color which is retained in the meat over a prolonged period, making the meat attractive to the housewife and thus salable for a sufficient length of time to permit packaging at a central location with transportation to retail outlets where it is displayed for consumer inspection and purchase. The central location may be a meat packaging plant or a plant designed primarily for making retail cuts from quarters, halves or whole carcasses, and treating and packaging the same.

The carbon monoxide treatment is preferably carried out when the meat is at a temperature of refrigeration, which is usually 32° to 38° F. but might be lower or higher. It may even be applied to frozen meat. However, carbon monoxide permeation is exceedingly slow if the meat is frozen. The meat which is to be sold in a frozen state, is preferably first treated with carbon monoxide and then frozen. The most rapid treatment is on meat that is introduced into an atmosphere of carbon monoxide at cutting-room temperature of 50° F. or somewhat above, and cooled during the carbon monoxide treatment, because cooling hastens the penetration of the gas into the meat.

The meat is usually cut into retail sizes (steaks, chops, roasts, etc.) before the treatment, and the treatment may be a mere surface treatment or may permeate the entire cut if it be thin enough or the time of treatment be long enough. The cuts are preferably wrapped after the treatment, but if packaged in a permeable film they may be packaged before treatment. They may be conveyed through the treating chamber continuously, or the treatment may be on a batch basis. Thus, they may be conveyed through the chamber on a conveyor moved continuously or intermittently, or they may be moved mechanically or manually in and out of the the chamber on trucks or racks, etc. The various cuts are preferably separated from one another during the treatment so that all or substantially all of the surface of the meat is exposed to the carbon monoxide atmosphere. The treating chamber may be a small vessel or an entire refrigerator of the type used in packaging plants, etc. It may be a long tunnel provided with a conveyor, the speed of the conveyor being regulated to provide the desired treatment as the meat passes through the tunnel.

If the meat is to be frozen, it may pass directly from the treating chamber to the freezer. For instance, if a tunnel is used for the carbon-monoxide treatment, the freezing may be done in a continuation of the tunnel, and the meat may be moved on a single conveyor throughout the length of the tunnel to produce the treated and frozen meat.

The carbon monoxide reacts with the myoglobin or the oxymyoglobin in the red meat producing a stable red pigment, carbon-monoxide myoglobin, of substantially the same color as the color of the bloomed freshly cut meat. Carbon monoxide does not react with metmyoglobin. In the presence of oxygen the carbon-monoxide myoglobin gradually changes to metmyoglobin, so the meat pigment of this invention, after the carbon monoxide treatment gradually changes to metmyoglobin. To retard this the meat is preferably wrapped in film of low oxygen permeability. The wrapper is preferably also moisture tight because evaporation of the moisture hastens the discoloration and causes weight loss which is a problem in pricing, etc.

The wrapper itself may be of a moisture-tight plastic composition or it may be coated or laminated with a moistureproofing layer. A satisfactory film is a film of rubber hydrochloride containing 5 parts of butyl stearate per 100 parts of the rubber hydrochloride, the film being .0008 inch thick. In the following tables, such film is designated Film No. 1. Film somewhat thicker or thinner is satisfactory, and other plasticizers may be used. Vinylidene chloride-vinyl chloride (about 85:15) film, somewhat less than .001 inch thick has proved quite satisfactory. Such film 0.00075 inch thick is designated Film No. 2. Rubber hydrochloride films with a plasticizer content of about 30 percent or more, and 0.0008 and 0.00075 inch thick respectively, are identified as Films No. 3 and 3A. Film No. 4 is regenerated cellulose sheet coated on one side and known as Cellophane 300 MSAD 80. Laminations which are satisfactory include a lamination of regenerated cellulose and polyethylene films, and such a lamination is designated as Laminate No. 1 in Table I.

Table I shows the relation of oxygen transmission to the salable shelf life for the carbon-monoxide treated meat wrapped in films having different oxygen-transmission rates. The rate of oxygen transmission is given in cubic centimeters per twenty four hours per 100 square inches as determined by ASTM test method D1434–58 (alternate).

Table I

|  | Rate of Oxygen Transmission | Salable Shelf Life |
| --- | --- | --- |
| Film No. 1 | 15 | 20 days. |
| Film No. 2 | 5 | 20 days. |
| Film No. 3 | 150 | 6 days. |
| Film No. 4 | 200 | 6 days. |
| Laminate No. 1 | 1 | 3 mo. (vacuum-packaged). |

The laminate was the only wrapper having a sufficiently low oxygen-transmission rate to permit vacuum packaging.

The following table gives an interesting comparison of the surface-microorganism count per square inch on the surface of round steak wrapped in different films several days after being wrapped.

Table II

Count

Carbon-monoxide treated (after 8 days):
    Film No. 1 _____ 16,000
    Film No. 3A _____ 2,800,000
    Film No. 4 _____ 18,000,000
Not treated with carbon monoxide (after 7 days):
    Film No. 1 _____ 53,000,000
    Film No. 4 _____ 110,000,000

Thus the packaged meat of this invention, not only has longer shelf life, but has a lower microorganism count.

The invention will be further described in connection with the accompanying drawings, in which—

Figure 2:
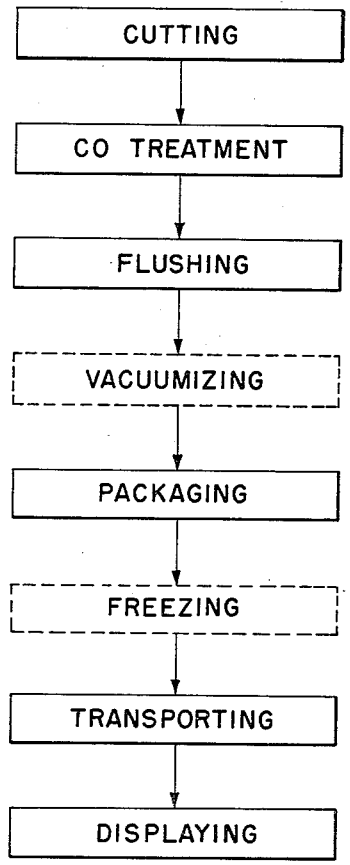

FIG. 1 is a view in perspective of a roast wrapped in satisfactory film, partly in section to indicate the depth of the carbon monoxide treatment; and FIG. 2 is a flow sheet illustrating the sequence of steps in the treatment. The "Freezing" step is optional.

Referring more particularly to FIG. 2, the first stage of the process is to cut the meat into retail pieces such as steaks, chops and roasts. The meat may arrive at the packaging center as a whole carcass, a side, or a quarter. The meat is cut at the packaging center and the carbon-monoxide treatment follows the cutting, just as soon as the meat has bloomed to the characteristic red color and before the exposed surfaces have discolored. There may be a delay of minutes, up to an hour or so before the carbon-monoxide treatment, but there is not sufficient delay to permit any substantial formation of metmyoglobin which does not react with carbon monoxide.

The carbon-monoxide treatment may be carried out in a pressurized vessel of any desired size. It is preferably carried out in a room or the like especially provided with the necessary safety provisions to protect the workmen. If the operation is carried on a batch operation, much carbon monoxide will be lost as the batches are introduced and removed from the chamber. If the cuts are introduced on a truck or rack, they may be run through the entire length of the chamber on rails automatically, and the entrance and exit may be provided with vestibules, the entrance being for removal of air and replacement of carbon monoxide and the vestibule at the exit for the removal of carbon monoxide and its replacement by air, so as to prevent contamination of the surrounding atmosphere with an excess of carbon monoxide. If the chamber is pressurized, vestibules or the equivalent will be desirable. If the chamber is operated at substantially atmospheric pressure, there will be less need for vestibules.

Instead of racks run on rails, the cuts may be placed in baskets or the like attached to a conveyor and continuously conveyed through a long chamber with the conveyor moving continuously at a given speed, or intermittently to quickly move the baskets into and out of vestibules or the like provided at the two ends of the treating chamber.

It is customary to store meat at about 32° to 38° F. Such a temperature will advantageously be maintained within all or a part of the treating chamber. Different temperatures and different pressures may be utilized, as desired, and in apparatus equipped with vestibules such as heretofore suggested, any suitable means for bringing the meat under the desired pressure and relieving it from this pressure after the treatment may be utilized.

On removal from the treating chamber the packages may be flushed with air to remove CO, either individually or a whole rack or basket of the packages. Where the meat is wrapped manually, such flushing is desirable to protect the wrapping personnel from the effects of the carbon monoxide. Where the wrapping is mechanical, there may be an advantage in not flushing. In a mechanical plant the flushing is preferably combined with the wrapping. If the meat is vacuum packaged, it would not have to be flushed but would be packaged preferably immediately upon removal from the treating chamber.

If the meat is to be sold in a frozen state, it will usually be frozen after the carbon-monoxide treatment and preferably after packaging. Then it will be kept frozen up to and during its display in the supermarket.

The retail cuts may be wrapped individually in film, or several may be wrapped in a single package. Ordinarily, a single-ply wrap is satisfactory although, where required, several plies of film such as are satisfactorily used in a single wrapper may be used. These plies may be of the same composition or of different compositions. The meat may be packaged in any manner. For example, instead of wrapping in film it may be packaged in a glass container or the like.

A foil wrap is oxygen tight and moisture proof, and therefore makes a desirable package in which the treated meat has the attractive red color when the foil is ultimately removed just prior to using the meat. If plastic film is used, it is not necessary that the film be transparent, although primarily the invention is designed for the treatment of meat which is to be wrapped in transparent film and then displayed for sale in a supermarket or the like.

The present methods of preserving the red color of freshly cut meat are satisfactory where the meat is cut and packaged in the rear of a supermarket and immediately put on display. Such meats retain their salable red color for up to 3 or 4 days. They do not retain the color long enough to permit packaging at a central location in a city, with transportation to supermarkets or the like for display and sale. The treatment of this invention produces a salable red color in the meat which persists for days and permits packaging at a central location such as a meat-packing plant or a plant otherwise designed for such packaging, with transportation of the packaged meat to retail centers within a relatively large distribution area. For transportation, no means of preservation is required except that usually the tucks or the like which are used are refrigerated to 32° to 38° F., or lower if the meat is frozen. On recipt at the retail store the packages are displayed in the usual commercial refrigerated display cases. After packaging, no special treatment of the packages is required in order to maintain the red color produced by the carbon-monoxide treatment.

The carbon-monoxide treatment has no deleterious effect on any of the red meats. Its only noticeable effect is to produce a salable red color in the meat that persists for several days or longer, depending upon the depth that the treatment penetrates the meat, and whether the meat is subsequently vacuumized, and whether the film or other container is air permeable, etc.

What I claim is:

1. The method of treating raw fresh red meat, which consists of treating the meat in an atmosphere containing carbon monoxide and thereby giving the meat a red color due to a reaction product of the carbon monoxide and a pigment in the meat, and then packaging the raw meat in a transparent film enclosure of low oxygen and moisture permeability, and offering the meat for sale while the meat is still fresh and raw and of said red color.

2. The process of claim 1 in which the color of the central portion of the meat is not affected by the carbon monoxide treatment.

3. The process of claim 1 in which a retail cut of meat is treated with carbon monoxide.

4. A package of raw fresh red meat prepared by the process of claim 1.

References Cited in the file of this patent

UNITED STATES PATENTS

| | | |
|---|---|---|
| 2,490,951 | Dunkley | Dec. 13, 1949 |
| 2,623,826 | Grinstead | Dec. 30, 1952 |
| 2,930,704 | Williams | Mar. 29, 1960 |

FOREIGN PATENTS

| | | |
|---|---|---|
| 12,445 of 1905 | Great Britain | Apr. 19, 1906 |